United States Patent [19]
Oliver

[11] Patent Number: 5,987,479
[45] Date of Patent: Nov. 16, 1999

[54] LARGE BLOCK ALLOCATION FOR DISK-BASED FILE SYSTEMS

[75] Inventor: Richard Joseph Oliver, Laguna Beach, Calif.

[73] Assignees: Sony Corporation, Inc., Tokyo, Japan; Sony Pictures Entertainment, Culver City, Calif.

[21] Appl. No.: 08/936,567

[22] Filed: Sep. 24, 1997

[51] Int. Cl.[6] .................................................. G06F 12/02
[52] U.S. Cl. ............................................ 707/205; 711/173
[58] Field of Search ................................ 707/2, 101, 205, 707/206; 711/170, 171, 172, 173

[56] References Cited

U.S. PATENT DOCUMENTS

| 5,339,411 | 8/1994 | Heaton, Jr. | 711/171 |
| 5,375,233 | 12/1994 | Kimber et al. | 707/205 |
| 5,481,702 | 1/1996 | Takahashi | 707/205 |
| 5,706,472 | 1/1998 | Ruff et al. | 711/173 |
| 5,742,443 | 4/1998 | Tsao et al. | 360/50 |
| 5,819,030 | 10/1998 | Chen et al. | 709/220 |
| 5,890,169 | 3/1999 | Wong et al. | 707/206 |

FOREIGN PATENT DOCUMENTS 0375188  6/1990  European Pat. Off. ...... G06F 15/407

OTHER PUBLICATIONS

International Search Report, PCT/US98/18880, Jan. 14, 1999, 4 pgs.
IBM Technical Disclosure Bulletin, vol. 26, No. 6, Nov. 1983, 1 pg.
Helen Custer, "Inside the Windows NT File System", Microsoft Press, pp. 6–7, 19–23, 1994.
Gordon Meyer, "Partition Magic: Finder of the Lost Megabytes," PC World, Mar. 1997.
"Fine–Tuning Netware Settings," Corporate Computing, V1, n1, p. 164(1), Jun.–Jul., 1992.
Bob Matthews, "Care and Feeding of Your Hard Disk," PC Computing, V5, n5, p. 306(1), May 1992.

Primary Examiner—Eddie P. Chan
Assistant Examiner—Gary J. Portka
Attorney, Agent, or Firm—Blakely, Sokoloff, Taylor & Zafman LLP

[57] ABSTRACT

A system for allocating block sizes in a computer file system is described. Input/output bandwidth requirements for disk access from an application is determined. Also determined is a data transfer characteristic for the drive being accessed. The minimum block size which reduces file fragmentation below a minimum threshold is then calculated as a function of the determined maximum input/output bandwidth and the data characteristic of the drive.

14 Claims, 4 Drawing Sheets

| A1 | B1 | B2 | C1 | D1 | D2 | D3 | FREE |
|----|----|----|----|----|----|----|------|
| 201 | 202 | 203 | 204 | 205 | 206 | 207 | 210 |

FIG. 2A

| Free | B1 | B2 | Free | D1 | D2 | D3 | FREE |
|------|----|----|------|----|----|----|------|
| 201 | 202 | 203 | 204 | 205 | 206 | 207 | 210 |

FIG. 2B

| E1 | B1 | B2 | E2 | D1 | D2 | D3 | E3 | FREE |
|----|----|----|----|----|----|----|----|------|
| 201 | 202 | 203 | 204 | 205 | 206 | 207 | 208 | 210 |

FIG. 2C

| A1 | B1 | C1 | D1 | FREE |
|---|---|---|---|---|
| 301 | 302 | 303 | 304 | 305 |

FIG. 3

DETERMINE I/O BANDWIDTH REQUIRED FOR APPLICATION TO READ/WRITE TO FILES ON DISK
402

DETERMINE THE DATA TRANSFER CHARACTERISTICS OF THE DISK DRIVE
404

CALCULATE THE MINIMUM BLOCK SIZE TO REDUCE FILE FRAGMENTATION BELOW REQUIRED THRESHOLD
406

MODIFY THE FILE SYSTEM FORMAT TO ALLOCATE BLOCK SIZES FOR MINIMIZED FRAGMENTATION
408

FIG. 4

LARGE BLOCK ALLOCATION FOR DISK-BASED FILE SYSTEMS

FIELD OF THE INVENTION

The present invention relates generally to the field of computer operating systems, and more particularly to block size allocation for disk-based file systems.

BACKGROUND OF THE INVENTION

Disk based operating systems divide a disk into physical sectors which represent the fundamental units for data storage on the disk. A sector is a portion of the circumference of a track on the disk and represents the minimum physical storage unit on the disk. File systems define blocks as some integer multiple number of sectors. Each block represents the minimum logical storage unit for a disk. Therefore, reading and writing data to a disk involves the use of entire blocks. In general purpose disk file systems, block sizes are usually selected to be small (e.g., 512 bytes/block), in order to minimize the waste of disk space in blocks that are only partially filled. Such file systems also attempt to allocate the small blocks in sequential order on the disk, so that large reads and writes to the file can be performed efficiently. However, as files are created, modified, or deleted, the free space on the disk can quickly become scattered so that new files are not allocated disk space which is sequential on the disk. These new files will therefore be physically discontiguous or "fragmented".

Access to blocks in a file that are logically sequential, but discontiguous on the disk is often much slower than access to physically sequential blocks, because a disk seek operation must be performed between accesses to the physically separate blocks on the disk. Usually after many files have been created and deleted on such a file system, some degree of fragmentation is bound to exist. In fact, if application programs are not restricted in the way in which they allocate free disk space to files, there is no general way to prevent the free space from becoming completely fragmented. For real-time applications which depend on a high amount of disk input/output bandwidth, this arbitrary degree of fragmentation may cause a failure due to increased access time to the files.

One common method of reducing file fragmentation is to use an optimization utility program which reorganizes files on a disk so that blocks allocated to each file are sequential and contiguous. However, the use of such a utility requires the user to monitor the degree of disk fragmentation and run the utility when fragmentation poses a problem. Moreover, disk optimizer programs usually take a significant amount of time to run, and prevent access to the disk while optimization is being performed.

Another method to minimize file fragmentation is to increase the block size, so that even if files do become fragmented, fewer seek operations will be required to access a specific amount of contiguous data in the file. However, increasing the block size also increases the memory requirements for buffering, and the disk I/O latency for accessing data. Moreover, simply increasing block size does not ensure that fragmentation will not occur to any degree, and does not ensure that the amount of disk space wasted in blocks that are only partially filled is minimized.

Most general purpose file systems are suitable for use with applications for which a certain amount of fragmentation is allowable and does not adversely affect performance. Certain applications, however, require data transfer operations to disk to be completed within a minimum of time. This time requirement translates to a minimum disk input/output bandwidth and is typically measured in terms of number of bytes written to, or read from, the disk per unit time. For such applications, any amount of file fragmentation may introduce seek operations which increase disk access times beyond the minimum bandwidth requirements. Examples of I/O intensive applications include real-time applications which require extensive disk access.

It is therefore an intended advantage of the present invention to provide a system for allocating block sizes in a disk file system which are large enough to prevent file fragmentation, yet not too large so that disk space is wasted within each block.

SUMMARY OF THE INVENTION

The present invention discloses a method for allocating block sizes in a disk based file system depending on the size of the files written to the disk and operating parameters of the disk drive. In one embodiment of the present invention, the maximum input/output bandwidth requirement for applications accessing a disk drive using the file system is determined. Also determined is the maximum seek time for the disk drive to seek from one block to a second block on the disk, and the minimum transfer rate of the disk drive. Using this information, the block size is calculated such that file fragmentation on the disk is reduced below a threshold required for the application to maintain a minimum disk I/O throughput.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements, and in which:

FIGS. 2A, 2B, and 2C illustrate the fragmentation of files in a disk file system.

FIG. 3 illustrates the allocation of blocks according to one embodiment of the present invention.

FIG. 4 is a flowchart illustrating the process of allocating block sizes to prevent excessive fragmentation according to one embodiment of the present invention.

DETAILED DESCRIPTION

Figure 1:
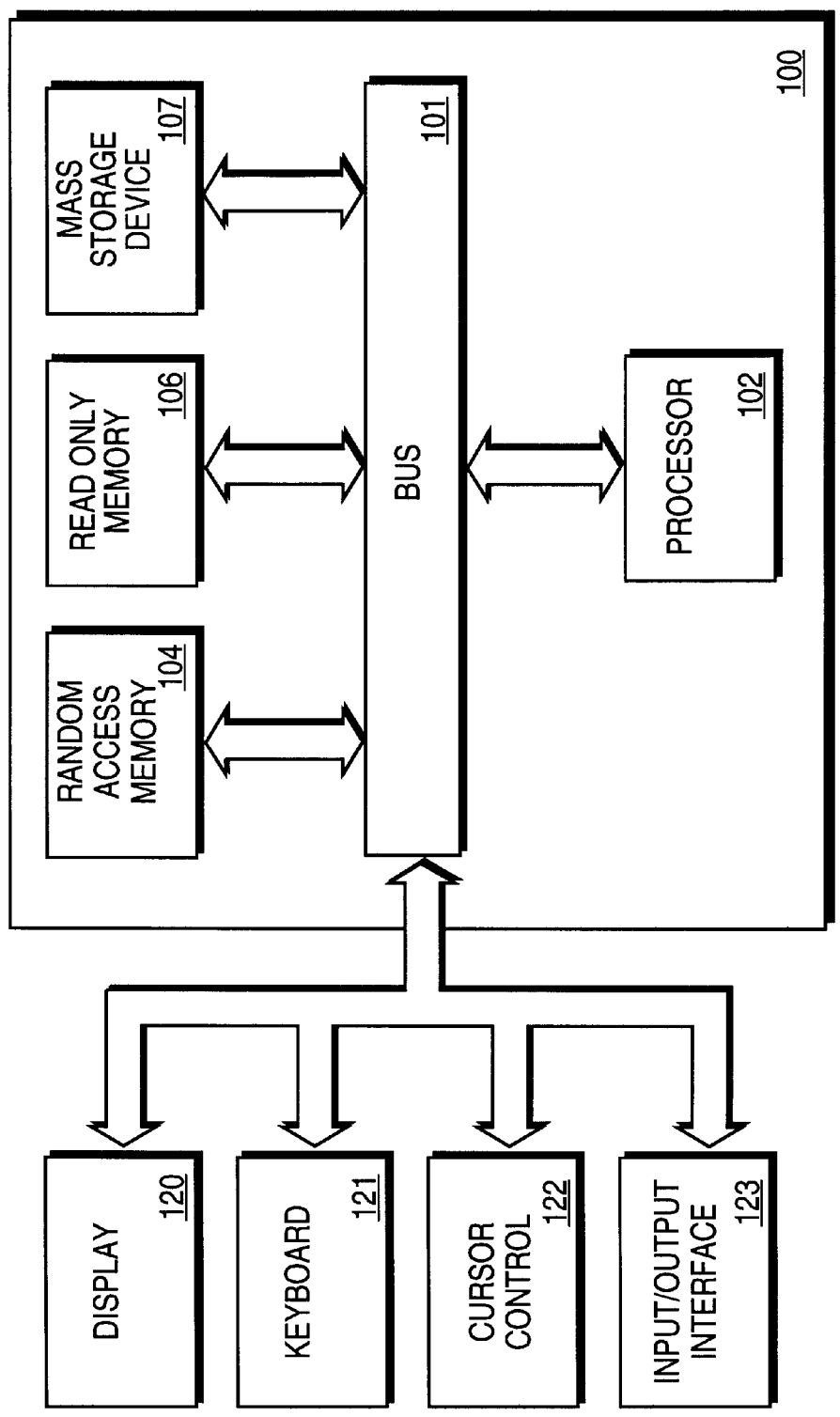
FIG. 1 is a block diagram of a computer system which may be used to implement an embodiment of the present invention.

A system for allocating block sizes to prevent file fragmentation in a disk file system is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form to facilitate explanation.

Hardware Overview

FIG. 1 illustrates a block diagram of a computer which may be used to implement an embodiment of the present invention. The computer system 100 includes a processor 102 coupled through a bus 101 to a random access memory (RAM) 104, a read only memory (ROM) 106, and display device 120. Keyboard 121 and cursor control unit 122 are coupled to bus 101 for communicating information and command selections to processor 102. Also coupled to processor 102 through bus 101 is an input/output (I/O) interface 123 which can be used to control and transfer data to electronic devices connected to computer 100.

Mass storage device 107 is also coupled to processor 102 through bus 101. Mass storage device 107 represents a memory device which stores data accessible from processor 102 through a block-based file system used by the computer system 100. Mass storage device 107 may be a persistent data storage device, such as a floppy disk drive or a fixed disk drive (e.g., magnetic, optical, magneto-optical, or the like) which can directly access locations on the disk for reading and writing data to and from the disk media. Alternatively, mass storage device 107 could be a tape drive which accesses data sequentially on streaming tape media. It should be noted that the architecture of FIG. 1 is provided only for purposes of illustration, and that a computer used in conjunction with the present invention is not limited to this specific architecture.

Block Size Allocation

Disk file systems organize data on disks in logical blocks. As files are deleted or modified, blocks which are freed become occupied by other files, resulting in file fragmentation in which data within a particular file may be spread among several non-contiguous blocks. FIGS. 2A–2C illustrate the process of file fragmentation created by the deletion and addition of files in a disk file system. In FIG. 2A, file A occupies block A1; file B occupies blocks B1 and B2; file C occupies block C1, and file D occupies blocks D1, D2, and D3; and the rest of the disk is free. FIG. 2B illustrates the allocation of blocks if files A and C are deleted. In this case, A1 and C1 are now marked as free. FIG. 2C illustrates the allocation of blocks if a new file E, is written to the disk. In this case, E is a file which requires three blocks. The first block of file E is written to the first free block (formerly A1) and is represented as block E1; the second block of file E is written to the second free block (formerly C1) and is represented as block E2, and the third block of file E is written to the next free block, E3. As can be seen in FIG. 2C, file E is stored in discontiguous blocks and is therefore fragmented. Access to such a file would involve the disk read/write head seeking across multiple tracks on the disk to locate the blocks in which portions of file E are stored. Such multiple seek operations can add a substantial amount time to the disk input/output (I/O) cycle.

One embodiment of the present invention provides a file system method which is suitable for use with applications with high disk I/O bandwidth requirements in which excessive file fragmentation may negatively impact application performance. A method of the present invention provides a system for allocating a block size in accordance with the requirements of files stored on the disk and the operating parameters of the disk drive system, so that file fragmentation may be reduced below the disk I/O bandwidth requirements of the application programs which access files on the disk.

Figure 3:
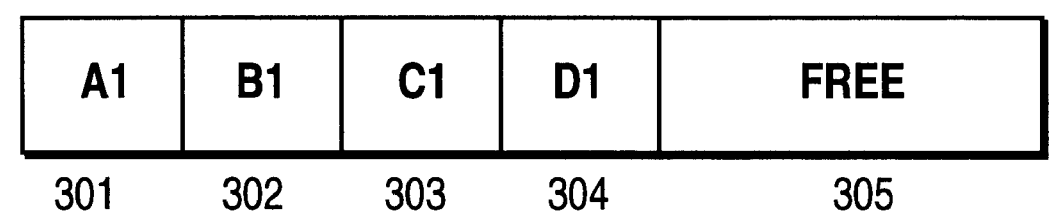

FIG. 3 illustrates the allocation of block sizes in accordance with one aspect of the present invention. In one embodiment, the block sizes are allocated a larger amount of disk space then the blocks illustrated in FIGS. 2A–2C. For example, if each block in FIGS. 2A–2C store 512 bytes to 4 kbytes of data (typical for disks used in personal computers), the blocks in FIG. 3 might be on the order of 1 Mbyte long. The increased block size allows a greater amount of data for each file to be written to the disk as a single unit. This increases the amount of time required to read and write to a single block, but increases the efficiency of the overall system, since seek operations are reduced or eliminated for accesses to a single file. Although the use of larger disk blocks may introduce the problem of disk space waste due to under-utilization, the size of the blocks is not chosen arbitrarily.

In one embodiment of the present invention, the optimum size of the disk block is selected as a function of the file size and disk performance parameters. The block size is chosen such that for a given set of files, the largest file is written to consecutive addresses on the disk (i.e., within one block) so that fragmentation is reduced below a particular threshold. This threshold could be selected such that fragmentation is completely eliminated. Alternatively, however, the block size could be selected to guarantee that an application will not fail due to file fragmentation. The elimination of fragmentation requires a trade-off between the increased latency and potential memory waste due to the increased memory size of each block against the reduced seek times and increased efficiency of single file read/write operations.

FIG. 4 is a flowchart illustrating the major steps of allocating block sizes to prevent fragmentation according to a method for one embodiment of the present invention. In step 402, the maximum disk I/O bandwidth required by the application for read/write cycles to a file on the disk is determined. The I/O bandwidth requirements of the application must be balanced against the data transfer characteristics of the drive. Therefore, in step 404, the data transfer characteristics of the disk drive are determined. For file access in cases where files may be fragmented, the maximum seek time for a drive to seek between two blocks on a disk, and the minimum data transfer rate of the drive are the critical operating parameters which are to be determined. However, it should be noted that other operating characteristics, such as disk rotational speed, number of disk platters, and number of read/write heads may also be taken into account.

After the application I/O bandwidth requirements and the disk drive characteristics have been determined, the minimum block size which reduces fragmentation below the minimum threshold is determined, step 406. In step 408, the file system format is modified so that blocks are allocated the amount of disk space calculated in step 406. If the I/O requirements and drive seek characteristics have been accurately determined, the calculation performed in step 406 should provide the minimum block size required to guarantee that an application meets performance requirements in the face of worst-case fragmentation of files on the disk.

In one embodiment, a method of the present invention is used in an application in which multiple channels of data are written to or read from a disk simultaneously. The bandwidth of the application is partitioned into a number of different I/O channels. Each I/O channel has a continuous data rate that must be supported by the storage device, as well as a number of extra seeks (referred to as edits) that may be required by the channel to collect or write data from different locations on the device. For this embodiment, step 402 in FIG. 4 corresponds to defining the period over which an application defines an integral maximum number of edits for each channel. In general, an edit includes any operation involving discontinuous events stored on the disk. In this case, the application must seek between different files on a disk, or between different blocks within the same file on a disk. Each edit is defined as an extra seek required while performing I/O on that channel over the given period. This is done whenever the application needs to switch a channel from performing I/O operations in the middle of one block to the middle of another block, as would be the case for accessing non-linear channels that have been edited. The maximum continuous data rate required by each channel is also determined.

The parameters which depend on the performance characteristics of the storage device are then defined. Worst-case characteristics are used in order to overestimate the block size, so that the application will attain the required bandwidth even with the worst case fragmentation effects. Step 404 of the flowchart of FIG. 4 corresponds to determining the minimum sustained transfer rate (without seeks) of the device, as well as the maximum amount of time required to seek from one location on the disk to any other location on the disk.

This method of the present invention thus yields the following constants:

period=the number of seconds over which a channel will have, at most, the specified number of edits.

$edits_i$=the maximum number of extra seeks that may be required by channel i over the given period.

$rate_i$=the required continuous data rate for channel i, in bytes/second.

$rate_{min}$=minimum (worst-case) sustained transfer rate of the device, in bytes/second.

$seek_{max}$=maximum (worst-case) seek time between accessing two blocks on the device, in seconds.

Using the above variable values, the file system can determine the minimum block size required to guarantee bandwidth to the application such that the effects of fragmentation are eliminated, or reduced below a threshold value. According to one embodiment of the present invention, the minimum block size is calculated in step 406 by the following formula:

$$blockSize_{min} = \frac{seek_{max} \times \sum_{channels} rate_i}{1 - \frac{seek_{max} \times \sum_{channels} edits_i}{period} - \frac{\sum_{channels} rate_i}{rate_{min}}}$$

For a block-oriented device, the resulting block size would ordinarily be rounded up to the next physical sector size for efficiency. Since the calculation yields the minimum required block size, increasing the block size will not compromise the guaranteed bandwidth. It should be noted that the denominator on the right-hand side of the above equation must be positive. A negative value indicates that the device cannot guarantee bandwidth for the specified number of channels in the application, due to some combination of an excessive bytes/seconds rate and an excessive number of extra seeks.

The following example is provided to illustrate the calculation of a minimum block size using the equation presented above. For this example, it is assumed that there is a 20-channel audio application, with each channel requiring 100 kbytes of data every second with the potential of one edit per channel per second. Given a device with a 4 MB/s mininum sustained transfer rate and a 10 millisecond worst-case seek time, the minimum block size for the application would be:

$$blockSize_{min} = \frac{0.01 \times 2,000,000}{1 - 0.01 \times 20 - \frac{2,000,000}{4,000,000}} = 66,667 \text{ bytes}$$

In the above example, if the application added a video channel that required 1 MB/s of data with the potential of two edits per second, the file system would have to change the size of the blocks allocated to the application as follows:

$$blockSize_{min} = \frac{0.01 \times (20 \times 100,000 + 1,000,000)}{1 - \frac{0.01 \times (20 \times 1 + 2)}{1} - \frac{(20 \times 100,000 + 1,000,000)}{4,000,000}} = 1,000,000 \text{ bytes}$$

In one embodiment of the present invention, the minimum block size required to eliminate file fragmentation is performed by a processor coupled to the disk drive which is to be accessed (e.g., processor 102 in computer system 100). The formula to calculate the minimum block size in step 406 of FIG. 4 could be made available as a subroutine written in a high-level computer language, such as C or Pascal, and incorporated into the file system software. Similar programs could be provided to also determine the I/O bandwidth requirements of applications to be used to perform disk read/write operations. Finally, a program could be utilized to determine the block seek time, and other critical performance parameters for the disk to be accessed.

In an alternative embodiment of the present invention, block sizes may be allocated dynamically in accordance with specific requirements of a particular application. For example, some applications may not require as large a block size as others. In this case, allocating a fixed block size which accommodates the largest blocks may result in disk space waste for applications which only require smaller blocks. Thus, the file system may be configured to allocate block sizes on a single disk which are more closely related to the actual requirements of each application.

One embodiment of the present invention is used in a file system in a computer implemented digital player/recorder which allocates blocks of 32,768 data samples each. Applications include audio record and playback programs which read and write multiple tracks of data simultaneously to the disk. Such applications present a great potential for file fragmentation. Fragmentation occurs because in simultaneous recording, a portion of the first track is written to a block (assuming the block is too small to accommodate the entire file), a portion of the second track is written to the next block, and so forth.

Such applications typically also have rigorous minimum disk I/O bandwidth requirements for playback. For these applications, the disk head may be forced to seek among blocks on the disk in order to play a single track, and data samples may not be read from the disk within the required transfer times. In this case, the audio data played back may be interrupted or otherwise distorted. The allocation of block sizes in accordance with the I/O bandwidth requirements of the applications and the data transfer characteristics of the disk drive, as described in reference to FIG. 4, would ensure that data transfers would not fail due to file fragmentation effects.

Although the above discussion was written in the context of audio applications, it should be noted that a method of the present invention could be used in other similar applications, such as applications which involve both video and audio content, or applications which involve high-speed calculations on limited amounts of data.

The steps of a method of the present invention may be implemented by a central processing unit (CPU) in a computer executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to the present invention. The instructions may be loaded into the memory of the computer from a storage device or from one or more other computer systems over a network connection. Consequently, execution of the instructions may be performed directly by the CPU. In other cases, the instructions may not be directly executable by the CPU. Under these circumstances, the instructions may be executed by causing the CPU to execute an interpreter that interprets the instructions, or by causing the CPU to execute instructions which convert the received instructions to instructions which can be directly executed by the CPU. In other embodiments, hardwired circuitry may be used in place of, or in combination with, software instructions to implement the present invention. Thus, the present invention is not limited to any specific combination of hardware circuitry and software, nor to any particular source for the instructions executed by the computer.

In the foregoing, a system has been allocating block sizes for a disk based file system to prevent file fragmentation on the disk. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of configuring a computer file system to reduce file fragmentation, the method comprising the steps of:
    determining the maximum input/output bandwidth requirement for data storage accesses for applications using said file system;
    determining a data transfer characteristic for a data storage device accessed by said applications;
    determining a maximum threshold below which file fragmentation is acceptable for application input/output performance; and
    calculating the block size as a function of said maximum input/output bandwidth and said data transfer characteristic, such that read/write operations to said data storage device result in file fragmentation being below said threshold.

2. A method according to claim 1 wherein said data transfer characteristic comprises the maximum seek time for said data storage device to seek from one block on said data storage device to a second block on said data storage device, and the minimum data transfer rate of said data storage device.

3. A method according to claim 2 further comprising the step of programming said file system so that logical blocks on said data storage device are allocated an amount of space corresponding to the calculated block size.

4. A method according to claim 3 wherein said maximum threshold is selected such that file fragmentation is eliminated during write operations from said applications to said data storage device.

5. A method according to claim 3 wherein said maximum threshold is different for one or more applications of said applications, and said step of calculating said minimum block size further comprises the step of allocating blocks of a first block size for a first set of applications of said applications, and allocating blocks of a second block size for a second set of applications.

6. A method according to claim 3 wherein said maximum input/output bandwidth requirement is different for one or more applications of said applications, and said step of calculating said minimum block size further comprises the step of allocating blocks of a first block size for a first set of applications of said applications, and allocating blocks of a second block size for a second set of applications.

7. A method according to claim 3 wherein said the maximum input/output bandwidth requirement for data storage device accesses for applications using said file system comprises an amount of time required to perform seek operations and a minimum required data transfer rate.

8. A method according to claim 7 further comprising the step of determining the time required to perform seek operations between blocks representing discontinuous events stored on said data storage device.

9. An apparatus for configuring a computer file system to reduce file fragmentation, the apparatus comprising:
    means for determining the minimum input/output bandwidth requirement for disk drive accesses for applications using said file system;
    means for determining the maximum seek time for a disk drive accessed by said applications to seek from one block on said disk to a second block on said disk;
    means for determining the minimum data transfer rate of said disk drive;
    means for determining a maximum threshold below which file fragmentation is acceptable for application input/output performance; and
    means for calculating the block size as a function of said minimum input/output bandwidth and said maximum seek time, such that read/write operations to said disk drive result in file fragmentation being below said threshold.

10. An apparatus according to claim 9 further comprising means for programming said file system so that logical blocks on said disk are allocated an amount of disk space corresponding to the calculated block size.

11. A computer readable medium having stored thereon sequences of instructions which are executable by a processor, and which, when executed by the processor, cause the processor to perform the steps of:
    determining the minimum input/output bandwidth requirement for disk drive accesses for applications using said file system;
    determining the maximum seek time for a disk drive accessed by said applications to seek from one block on said disk to a second block on said disk;
    determining a maximum threshold below which file fragmentation is acceptable for application input/output performance; and
    calculating the block size as a function of said minimum input/output bandwidth and said maximum seek time, such that read/write operations to said disk drive result in file fragmentation being below said threshold.

12. A computer according to claim 11 wherein the memory further contains instructions which cause the processor to perform the step of programming said file system so that logical blocks on said disk are allocated an amount of disk space corresponding to the calculated block size.

13. A computer system comprising:

a bus;

a data storage device coupled to said bus; and a processor coupled to said data storage device, said processor operable to receive instructions which, when executed by the processor, cause the processor to perform the steps of:

determining the maximum input/output bandwidth requirement for data storage accesses for applications using said file system;

determining a data transfer characteristic for said data storage device;

determining a maximum threshold below which file fragmentation is acceptable for application input/output performance; and calculating the block size as a function of said maximum input/output bandwidth and said data transfer characteristic, such that read/write operations to said data storage device result in file fragmentation being below said threshold.

14. A computer system according to claim 13 wherein said data transfer characteristic comprises the maximum seek time for said data storage device to seek from one block on said data storage device to a second block on said data storage device, and the minimum data transfer rate of said data storage device.

\* \* \* \* \*